May 3, 1966  C. E. QUINN  3,249,916

TIRE CONDITION MONITORING SYSTEM

Filed March 7, 1963

INVENTOR.
Clark E. Quinn
BY
Paul J. Ethington
ATTORNEY

United States Patent Office 3,249,916
Patented May 3, 1966

3,249,916
TIRE CONDITION MONITORING SYSTEM
Clark E. Quinn, Rochester, Mich., assignor to General Motors Corporation, Detroit, Mich., a corporation of Delaware
Filed Mar. 7, 1963, Ser. No. 263,499
2 Claims. (Cl. 340—58)

This invention relates to a system for transmitting information between elements that may have relative movement and more particularly to a circuit wherein a capacitor is employed as a means for coupling the tire of a motor vehicle to detecting and indicating means whereby the condition of the tire may be continuously monitored whether the vehicle is in motion or in a static condition.

Tire pressure is an important factor in the safe and efficient operation of a motor vehicle. For example, excessive and sometimes dangerous wear will result when motor vehicle tires are maintained even for a relatively short period of time in an underinflated condition. At present, the vehicle operator must personally inspect the tires or rely on poor vehicle performance to be alerted to the fact the vehicle tires are improperly inflated.

The basic problem involved in any tire pressure monitoring system is that of transmitting the intelligence, in this case tire pressure, from the tire which is rotating to the indicator which is within the vehicle body. Various systems have been proposed in the past for transmitting the information from the rotating wheel to a stationary indicator but none of these systems has proven entirely satisfactory. For example, it has been proposed to use pairs of magnetically energized coils mounted in opposed relation to each other, one pair on the wheel and the other pair on the brake shoe assembly. A drop in tire pressure causes current to be induced into one of the coils as the tire rotates. This current is then used as a means of indicating low tire pressure. Another scheme substitutes permanent magnets for the coils and accomplishes essentially the same results.

The shortcomings of these prior art systems are manifold. They are susceptible to road and brake dirt particles as well as to extremes in temperature. In addition, they incorporate numerous parts that require exact and expensive manufacture and mounting. Further and more importantly, they require rotation of the wheel for a proper indication and hence are inoperative when the wheel is stationary.

The present invention obviates the shortcomings of the prior art systems by providing a tire pressure monitoring system which is simple, fool proof, and economical. In accordance with this invention, the magnitude of the output of an oscillator is employed as an indication of the air pressure in the vehicle tire. This is accomplished by inductively coupling an external monitoring circuit to the oscillator tank circuit. More specifically, the inductor of the tank circuit is utilized as the primary winding of a transformer and, by means of a pressure responsive switch, a capacitor is connected in series with the secondary winding of the transformer upon the existence of an excessively low tire pressure whereby the secondary winding is tuned to the resonant frequency of the tank and the oscillator output is increased sufficiently to actuate a relay. Actuation of the relay causes energization of an indicator which informs the operator of the low tire pressure condition. Under normal operating conditions, the oscillator output is insufficient to actuate the relay due to the detuning effect of the transformer secondary.

The capacitor employed in this invention comprises a rotating and a stationary plate, the rotating plate being mounted on the brake drum assembly while the stationary plate is mounted on the brake shoe assembly. The capacitance of the capacitor is, of course, not dependent upon relative rotation of the plates and therefore will perform its function in the system whether the vehicle is in motion or is stationary.

A more complete understanding of the invention may be had from the detailed description which follows taken with the accompanying drawings in which.

Figure 1:
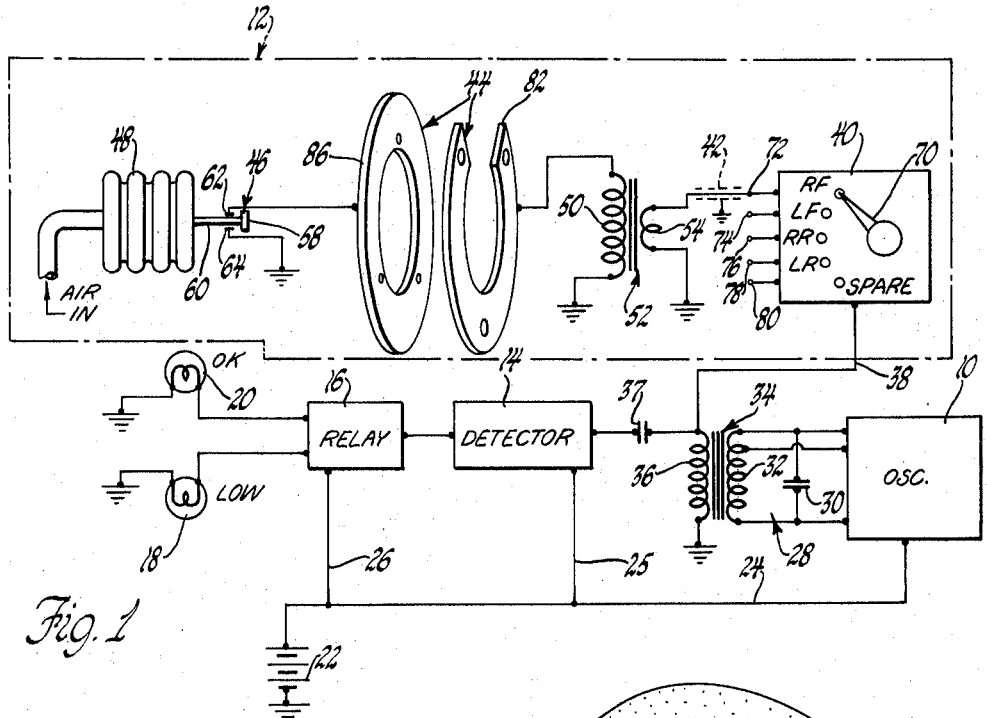
FIGURE 1 is a block diagram of a preferred embodiment of the invention.

Referring now to FIGURE 1, the tire pressure monitoring system comprises a source of alternating current such as an oscillator 10, a control or monitoring circuit 12, a detector 14, a relay 16, and indicator lamps 18 and 20.

The oscillator 10 is a conventional RF oscillator and operates in the 1700–2500 kilocycle range. A voltage source 22, which may be the vehicle storage battery, is connected to the oscillator 10, detector 14 and relay 16 through conductors 24, 25 and 26, respectively. A tank circuit 28 of the oscillator 10 comprises a capacitor 30 and a primary winding 32 of a transformer 34. The output of the oscillator 10 is obtained from a secondary winding 36 of the transformer 34. One terminal of the secondary winding 36 is grounded, the other terminal being connected to the detector 14 through the capacitor 37. The function of the detector 14 is to detect the level of the output signal of the oscillator 10. Under normal conditions, the indicator lamp 20 is connected across the battery 22 through the relay 16 which is normally de-energized. If the output of the oscillator 10 is sufficient to energize the relay 16, the indicator lamp 18 will be connected across the battery 22. In the interest of conserving power and minimizing the equipment necessary, it is apparent that indicator lamp 20 may be omitted.

The monitoring circuit 12 is connected to the ungrounded terminal of the secondary winding 36 through a conductor 38, a selector switch 40, and a grounded coaxial cable 42. The monitoring circuit includes a capacitor 44, a switch 46, a transducer 48, and an inductor 50 which is the secondary winding of a transformer 52 having a primary winding 54 connected to the selector switch 40. The transducer 48 is mounted on the stem of a valve 56 of a vehicle tire 57 and may take the form of a bellows which expands and contracts in accordance with the amount of air pressure within the tire 57. As the bellows expands and contracts, a movable contact 58 of the switch 46 which is mounted on an armature 60 is caused to either separate from or engage the stationary contacts 62 and 64 of the switch 46. The stationary contact 62 is connected to the capacitor 44 while the stationary contact 64 is connected to a hub 66 of the vehicle wheel which is effectively at ground for an RF potential. Therefore, the capacitor 44 is disconnected from the monitoring circuit 12 except when the transducer 48 contracts sufficiently to close the contacts 58, 62, 64. The transducer 48 may be adjusted to close the circuit upon the occurrence of a predetermined pressure in the vehicle tire 57.

The selector switch 40 comprises an armature 70 which may be moved to any one of five positions in order to monitor the condition of the four vehicle tires in operation as well as the spare tire. Terminals 72, 74, 76, 78, and 80 are connected respectively to independent monitoring circuits associated with the right front, left front, right rear, left rear and spare tires of the vehicle. Only the monitoring circuit 12 associated with the right front tire 57 will be described in detail since each of the independent monitoring circuits is the same.

Figure 2:
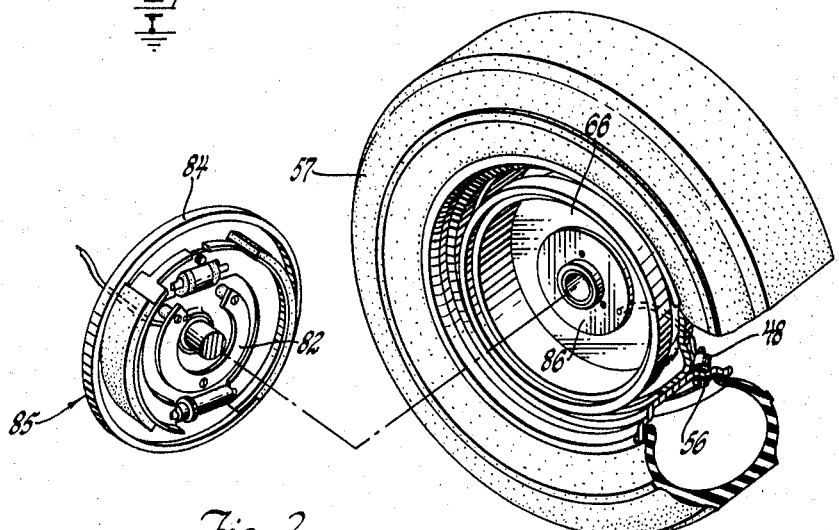
FIGURE 2 is an exploded perspective view with portions broken away of an automobile wheel and brake shoe assembly incorporating the system shown in FIGURE 1.

Referring now to FIGURE 2, the capacitor 44 has a stationary plate 82 mounted on and electrically isolated from a backing plate 84 of a brake 85 and a rotating plate 86 mounted on and also electrically isolated from the hub 66. When the brake 85 is assembled for normal operation, the capacitor plates 82 and 86 will be parallel to each other and approximately ⅛″ apart. As the tire 57 rotates during operation of the vehicle, it is obvious that capacitor plate 86 will also rotate while capacitor plate 82 will remain stationary. This fact does not change the axial positions of the plates or the effectiveness of plates 82 and 86 to function as a capacitor. The stationary capacitor plate 82 is connected to one terminal of secondary winding 50 of transformer 52. The other terminal of secondary winding 50 is grounded. The primary winding 54 of transformer 52 has one terminal grounded while the other terminal is connected to the selector 40.

In operation a change of 4 picofarads is sufficient to start or stop oscillations of the oscillator 10. When the air pressure within the tire is above a predetermined amount, the contacts 58, 62, and 64 will be separated. The capacitor plate 86 is therefore ungrounded. With the capacitor 44 out of the monitoring circuit 12, transformer secondary winding 50 will be off resonance and the oscillator output will be greatly reduced or stopped entirely and the relay remains de-energized and allows the lamp 20 to be energized. Should the air pressure in the tire decrease to a predetermined value, the transducer 48 causes the moving contact 58 to engage stationary contacts 62 and 64. This grounds the rotating capacitor plate 86 and causes the secondary winding 50 of transformer 52 to be adjusted to resonance with the oscillator 10. Under this resonant condition, the output of the oscillator 10 is sufficient to cause energization of the relay 16 thereby connecting the indicator lamp 18 across the battery 22 and thus indicating to the vehicle operator the low air pressure condition of the vehicle tire 57 being monitored.

The above description is given for illustrative purposes only and the scope of the invention is intended to be limited only by the following claims.

I claim:
1. A tire condition monitoring system for a vehicle having a plurality of wheels,
   said system comprising an oscillator having a tank circuit remotely located from said wheels,
   indicating means connected to receive the output of said oscillator and be energized thereby upon receipt of an output of predetermined magnitude,
   a capacitor having a first plate mounted on a fixed portion of said vehicle and a second plate mounted on one of said plurality of wheels and rotatable therewith,
   an inductive element mounted on a fixed portion of said vehicle,
   means inductively coupling said inductive element to said tank circuit,
   a condition responsive switch adapted to connect said capacitor to said inductive element to form a resonant circuit tuned to the frequency of oscillation of said oscillator whereby the output of said oscillator is increased to said predetermined amount thereby energizing said indicating means.

2. A tire pressure monitoring system for a motor vehicle having a plurality of wheels,
   said system comprising an oscillator having a tank circuit,
   a relay connected to receive the output of said oscillator,
   an indicator lamp connected to said relay and energizable upon energization of said relay,
   a capacitor having a first plate mounted on a fixed portion of one of said wheels and a second plate mounted on a rotatable portion of said one of said wheels,
   a first transformer comprising a primary and a secondary winding,
   said primary winding of said first transformer forming a part of said tank circuit,
   a second transformer mounted on a fixed portion of one of said wheels and comprising a primary and secondary winding,
   the primary winding of said second transformer being remotely located from and connected in series with the secondary winding of said first transformer,
   the secondary winding of said second transformer being connected to said first plate,
   a tire pressure responsive switch mounted on said one of said wheels and operable upon the existence of a predetermined tire pressure to connect said secondary winding of said second transformer to said second plate to form a parallel resonant circuit tuned to the resonant frequency of said tank circuit whereby the output of said oscillator is sufficient to energize said relay.

References Cited by the Examiner
UNITED STATES PATENTS
3,155,938  11/1964  Meyers _____ 340—58

NEIL C. READ, *Primary Examiner.*

A. H. WARING, *Assistant Examiner.*